United States Patent
Guo et al.

(10) Patent No.: US 12,438,357 B2
(45) Date of Patent: Oct. 7, 2025

(54) POWER FAILURE DETECTION CIRCUIT AND CONTROL CIRCUIT FOR VRF SYSTEM

(71) Applicant: Carrier Corporation, Palm Beach Springs, FL (US)

(72) Inventors: Xiaojun Guo, Shanghai (CN); Hui Zhai, Shanghai (CN); Jian Ni, Shanghai (CN); Zehang Yu, Shanghia (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 139 days.

(21) Appl. No.: 18/480,769

(22) Filed: Oct. 4, 2023

(65) Prior Publication Data
US 2025/0105619 A1    Mar. 27, 2025

(30) Foreign Application Priority Data
Sep. 25, 2023    (EP) ..................................... 23199545

(51) Int. Cl.
*H02H 7/00* (2006.01)
*G01R 23/02* (2006.01)
*H02H 7/20* (2006.01)

(52) U.S. Cl.
CPC ............ *H02H 7/20* (2013.01); *G01R 23/02* (2013.01)

(58) Field of Classification Search
None
See application file for complete search history.

(56) References Cited

U.S. PATENT DOCUMENTS

| | | | |
|---|---|---|---|
| 4,307,775 A | 12/1981 | Saunders et al. | |
| 4,674,292 A | 6/1987 | Ohya et al. | |
| 6,321,548 B1 | 11/2001 | Clarke et al. | |
| 7,612,468 B2 * | 11/2009 | Okui ...................... | H02J 9/062 307/64 |
| 7,723,866 B2 * | 5/2010 | Chang ..................... | G06F 1/263 307/64 |
| 8,631,663 B2 | 1/2014 | Wycoff et al. | |
| 9,651,285 B2 | 5/2017 | Kim et al. | |

(Continued)

FOREIGN PATENT DOCUMENTS

| | | |
|---|---|---|
| CN | 110332744 A | 10/2019 |
| EP | 2889553 B1 | 8/2016 |

(Continued)

OTHER PUBLICATIONS

Extended European Search Report received for EP Application No. 23199545.7, mailed on Feb. 20, 2024, 07 Pages.

*Primary Examiner* — Stephen W Jackson
(74) *Attorney, Agent, or Firm* — Drew Folgmann (57) ABSTRACT

The present application relates to a power failure detection circuit, the circuit comprises: a rectifying circuit for full-wave rectifying an alternating current voltage so as to obtain a first voltage; a switching circuit for converting the first voltage into a periodic voltage pulse; and a judgment circuit for providing an output signal to a fan control circuit for closing a fan when the periodic voltage pulse is not received within a preset time period, and providing the output signal to a micro-control unit for closing an electronic expansion valve. The present application also relates to a control circuit for a variable refrigerant flow VRF system.

20 Claims, 6 Drawing Sheets

(56) References Cited

U.S. PATENT DOCUMENTS

| | | |
|---|---|---|
| 10,286,752 B2 | 5/2019 | Jiang et al. |
| 11,022,356 B2 | 6/2021 | Walden et al. |
| 11,228,306 B2 * | 1/2022 | Wu .................... H03K 17/0822 |
| 2003/0089122 A1 | 5/2003 | Shen |
| 2006/0119311 A1 * | 6/2006 | Lee ........................... H02P 1/26 |
| | | 318/812 |
| 2008/0074824 A1 | 3/2008 | Furuhashi et al. |
| 2018/0269800 A1 | 9/2018 | Endo et al. |
| 2020/0067301 A1 * | 2/2020 | Boros ...................... H04B 1/16 |
| 2021/0325068 A1 | 10/2021 | Wakisaka |
| 2021/0348819 A1 | 11/2021 | Krishnamoorthy et al. |
| 2022/0128278 A1 | 4/2022 | Parker et al. |

FOREIGN PATENT DOCUMENTS

| | | | |
|---|---|---|---|
| EP | 3869123 A1 | 8/2021 | |
| GB | 2578372 A | 5/2020 | |
| JP | H03117859 A | 5/1991 | |
| KR | 10-1964589 B1 | 4/2019 | |

* cited by examiner

FIG. 1

(1) D1 and D3 are conducting while D2 and D4 are cutting off (2) D2 and D4 are conducting while D1 and D3 are cutting off

FIG. 2

(1) D1 and D3 are conducting while D2 and D4 are cutting off

FIG. 3

(2) D2 and D4 are conducting while D1 and D3 are cutting off

POWER FAILURE DETECTION CIRCUIT AND CONTROL CIRCUIT FOR VRF SYSTEM

CROSS REFERENCE TO RELATED APPLICATIONS

This application claims priority to EP Application Serial No. 23199545.7 filed on Sep. 25, 2023, which is incorporated by reference herein in its entirety.

TECHNICAL FIELD

The present application relates to the field of power failure detection, and in particular to power failure detection circuit and control circuit for variable refrigerant flow VRF system.

BACKGROUND

In a variable refrigerant flow VRF system, for example, when an external unit is connected to multiple indoor units, there is a problem: when the indoor unit suddenly loses power, a fan motor will stop rotating, a drain pump will stop operating immediately, and an electronic expansion valve will be in opening degree before the power failure. At this time, the external unit is also operating normally, and the refrigerant will continue to flow through the indoor unit in the state before the power failure. At this time, due to the loss of effective energy exchange, the refrigerant cannot be effectively evaporated or cooled, which is extremely likely to lead to malfunctions.

For example, the air contains moisture and there is no fan for air supply, surface temperature of a heat exchanger of the indoor unit will get lower and lower and temperature of an outer surface of the indoor unit will get lower and lower due to the continuous flow of the refrigerant, resulting in continuous condensation water flow, which will cause property damage and even safety hazards (especially in the case of the VRF system using flammable refrigerant).

SUMMARY

According to an aspect of the present application, there is provided a power failure detection circuit, the circuit comprises: a rectifying circuit for full-wave rectifying an alternating current voltage so as to obtain a first voltage; a switching circuit for converting the first voltage into a periodic voltage pulse; and a judgment circuit for providing an output signal to a fan control circuit for closing a first component when the periodic voltage pulse is not received within a preset time period, and providing the output signal to a micro-control unit for closing a second component.

As a supplement to or replacement of the foregoing, in the power failure detection circuit, the first component is a fan, the second component is an electronic expansion valve, a period T1 of the alternating current voltage is twice a period T2 of the first voltage, and a period T3 of the periodic voltage pulse is the same as the period T2 of the first voltage.

As a supplement to or replacement of the foregoing, in the power failure detection circuit, the preset time period is greater than the period T3 of the periodic voltage pulse, but less than twice the period T3 of the periodic voltage pulse.

As a supplement or replacement of the foregoing, in the power failure detection circuit, the rectifying circuit comprises a first diode, a second diode, a third diode, a fourth diode, a first resistor, and a second resistor, wherein a positive electrode of the first diode is coupled to a first input end of the rectifying circuit, a negative electrode of the first diode is coupled to a first end of the first resistor, a negative electrode of the second diode is coupled to the first input end, a positive electrode of the second diode is grounded, a negative electrode of the third diode is coupled to a second input end of the rectifying circuit, a positive electrode of the third diode is grounded, a positive electrode of the fourth diode is coupled to the second input end, a negative electrode of the fourth diode is coupled to the negative electrode of the first diode, and a second end of the first resistor act as an output of the rectifying circuit and is coupled to a first end of the second resistor, and a second end of the second resistor is grounded.

As a supplement or replacement of the foregoing, in the power failure detection circuit, the switching circuit comprises a third resistor, a fourth resistor, and a first triode, wherein a first end of the third resistor is coupled with the output of the rectifying circuit, a second end of the third resistor is coupled with a base of the first triode, a first end of the fourth resistor is coupled to a first power supply, a second end of the fourth resistor is coupled to a collector of the first triode, and an emitter of the first triode is grounded.

As a supplement or replacement of the foregoing, in the power failure detection circuit, the judgment circuit comprises: a monostable multivibrator which can be re-triggered; and a timing circuit coupled with the monostable multivibrator, the timing circuit being used for determining the preset time period.

As a supplement or replacement of the foregoing, in the power failure detection circuit, the timing circuit comprises a first capacitor and a sixth resistor, wherein the preset time period is determined according to a capacitance value of the first capacitor and a resistance value of the sixth resistor.

According to another aspect of the present application, there is provided a control circuit for a variable refrigerant flow VRF system, the control circuit comprising: a power failure detection circuit for detecting a power failure condition of a power supply and generating an output signal accordingly; a fan control circuit for controlling a fan according to the output signal; a micro-control unit interrupt generating circuit for generating an interrupt signal according to the output signal to provide to a micro-control unit; and an energy storage unit for providing electrical energy for the micro-control unit to close an electronic expansion valve, wherein the power failure detection circuit comprises: a rectifying circuit for full-wave rectifying an alternating current voltage so as to obtain a first voltage; a switching circuit for converting the first voltage into a periodic voltage pulse; and a judgment circuit for determining that there is the power failure condition of the power supply when the periodic voltage pulse is not received within a preset time period, and generating the output signal accordingly.

As a supplement or replacement of the foregoing, in the control circuit, the judgment circuit is configured to output a high-level signal when the power supply is normally supplied, and output a low-level signal when it is determined that there is the power failure condition of the power supply.

As a supplement or replacement of the foregoing, in the control circuit, the fan control circuit comprises: a second triode, a fifth diode, and an electromagnetic relay, wherein a base of the second triode is coupled to the power failure detection circuit, an emitter of the second triode is grounded, a collector of the second triode is coupled to a positive electrode of the fifth diode, a negative electrode of the fifth diode is coupled to a second power supply, a first end of the electromagnetic relay is coupled to the positive electrode of the fifth diode, and a second end of the electromagnetic relay is coupled to the negative electrode of the fifth diode.

As a supplement or replacement of the foregoing, in the control circuit, the fan control circuit is configured to disconnect a switch of the electromagnetic relay upon receiving the low-level signal from the power failure detection circuit, thereby disconnecting a loop formed by the switch, the fan, and the energy storage unit.

DESCRIPTION OF THE DRAWINGS

The above and/or other aspects and advantages of the present application will be clearer and more easily understood from the following description of various aspects in conjunction with the accompanying drawings, in which the same or similar elements are denoted by the same reference numerals. The accompanying drawings include.

DETAILED DESCRIPTION

The present application is described more fully below with reference to the accompanying drawings, in which illustrative embodiments of the application are illustrated. However, the present application may be implemented in different forms and should not be construed as limited to the embodiments presented herein. The presented embodiments are intended to make the disclosure herein comprehensive and complete, so as to more comprehensively convey the protection scope of the application to those skilled in the art.

In this specification, terms such as "comprising" and "including" mean that in addition to units and steps that are directly and clearly stated in the specification and claims, the technical solution of the application does not exclude the presence of other units and steps that are not directly or clearly stated in the specification and claims.

Unless otherwise specified, terms such as "first" and "second" do not indicate the order of the units in terms of time, space, size, etc., but are merely used to distinguish the units.

In this specification, "coupled" should be understood as including a case in which electrical energy or electrical signals are transmitted directly between two units, or a case in which electrical energy or electrical signals are transmitted indirectly through one or more third units.

In accordance with some embodiments of the present application, a power failure detection circuit comprises a rectifying circuit for full-wave rectifying an alternating current voltage and a switching circuit for converting it into a periodic voltage pulse. The power failure detection circuit further comprises a judgment circuit for providing an output signal to a fan control circuit for closing a fan when the periodic voltage pulse is not received within a preset time period, and providing the output signal to a micro-control unit for closing an electronic expansion valve. In this way, the power failure detection circuit can, on the one hand, timely close the fan through the fan control circuit in the event of a power failure to save energy in an energy storage unit, and on the other hand, timely notify the micro-control unit so as to utilize the energy in the energy storage unit to close the electronic expansion valve, thus avoiding safety hazards. In addition, the judgment circuit provides corresponding output signals (e.g., a low-level signal) to the fan control circuit and the micro-control unit when the periodic voltage pulse is not received within a preset time period, thus avoiding "false closing" of the fan and the electronic expansion valve caused by an unstable input signal from a utility power supply and other reasons.

Specific embodiments of the present application are further described below with the aid of the accompanying drawings. It should be noted that some non-essential features or circuit elements are not shown in the accompanying drawings for the purpose of more clearly describing what is relevant to the present application. However, for those skilled in the art, such omissions do not create difficulties in the implementations of the technical solutions described in the specification of the present application.

Figure 1:
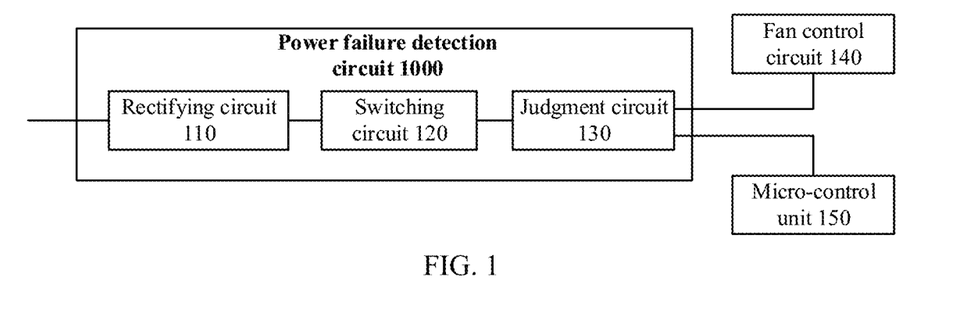
FIG. 1 is a structural schematic diagram of a power failure detection circuit according to embodiments of the present application.

FIG. 1 is a structural schematic diagram of a power failure detection circuit 1000 according to embodiments of the present application. As shown in FIG. 1, the power failure detection circuit 1000 comprises: a rectifying circuit 110, a switching circuit 120 and a judgment circuit 130, wherein the rectifying circuit 110 is used to full-wave rectify an alternating current voltage so as to obtain a first voltage; the switching circuit 120 is used to convert the first voltage into a periodic voltage pulse; and the judgment circuit 130 is used to provide an output signal to a fan control circuit 140 for closing a fan when the periodic voltage pulse is not received within a preset time period, and providing the output signal to a micro-control unit 150 for closing an electronic expansion valve.

In the context of the present application, the term "electronic expansion valve" is an element used to control the flow of refrigerant entering a refrigeration device. In situations where a load varies dramatically or where a wide range of operating conditions exists, conventional throttling elements (e.g., capillary tubes, thermal expansion valves, etc.) can no longer meet requirements of comfort and energy conservation, which are well met by a fast adjustment response of the electronic expansion valve. For example, the electronic expansion valve utilizes an electrical signal generated by parameters being adjusted to control voltage or current applied onto the expansion valve, thereby achieving the purpose of adjusting the amount of liquid supplied. In some embodiments of the present application, the electronic expansion valve receives a control signal from the micro-control unit 150, i.e. is controlled by the micro-control unit MCU.

Figure 2:
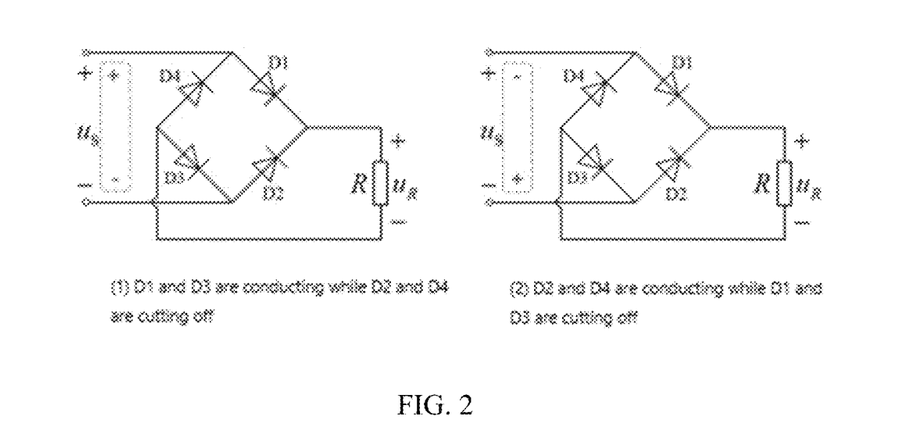
FIGS. 2 to 4 are operating principle diagrams of a rectifying circuit.

FIG. 2 shows operating principle diagram of a bridge rectifying circuit (also referred to as a rectifying bridge) that performs full-wave rectification. Generally speaking, a form of electrical energy conversion that converts alternating current to direct current is called rectification (AC/DC conversion), and a corresponding circuit is called a rectifying circuit. The bridge rectifying circuit (also referred to as a rectifying bridge) is a type of rectifying circuit. As shown in FIG. 2, the rectifying bridge has four wiring terminals, two of which are connected to the AC input ($u_S$) and the other two are connected to the DC output ($u_R$). An input voltage, such as sinusoidal alternating current, is divided into positive and negative half-waves, that is, direction and magnitude of the input voltage change periodically, while direction of an output voltage remains unchanged, only changing in magnitude.

Figure 3:
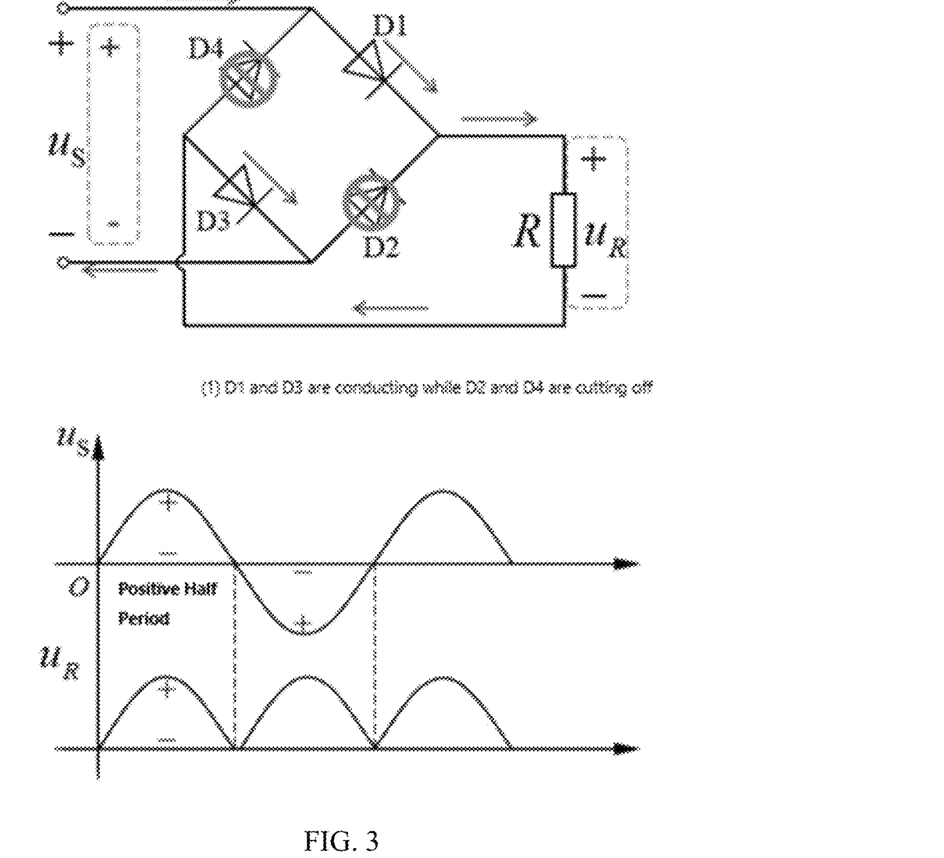

Specifically, when the input voltage is a positive half-period, diodes D1 and D3 are conducting, and diodes D2 and D4 are cutoff, as shown in FIG. 3. When a waveform of the input voltage is in the positive half-period, it indicates that an actual direction of the input voltage is exactly "+" up and "−" down. At this time, an anode (positive electrode) of the diode D1 is at a high potential, so it is conducting in the forward direction, but a cathode of the diode D4 is connected to a high potential, so it is cut off in the reverse direction. Similarly, a cathode (negative electrode) of the diode D3 is connected to a low potential, so it is conducting in the forward direction, but an anode (positive electrode) of the diode D4 is connected to a low potential, so it is cut off in the reverse direction.

Continue to refer to FIG. 3, the connectivity of the entire circuit is shown in FIG. 3, the actual voltage generated by the current along a load resistor is "+" up and "−" down, consistent with its reference direction, the waveform is positive, ignoring the tube voltage drop, it can be concluded that the output voltage is equal to the input voltage in magnitude.

Figure 4:
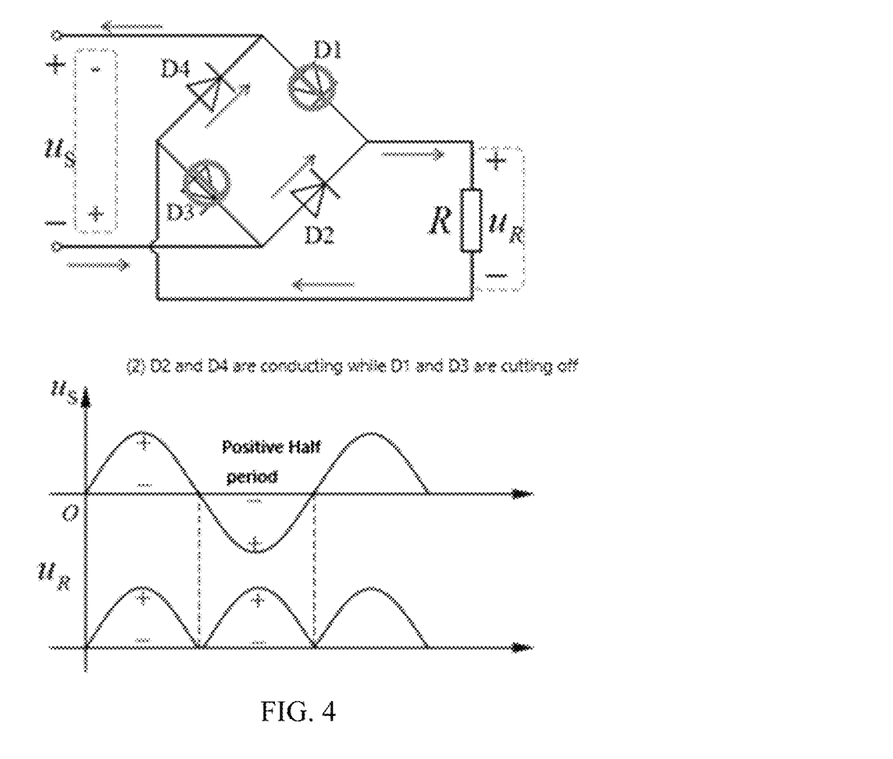

When the input voltage is a negative half-period, diodes D2 and D4 conduct in the forward direction, and diodes D1 and D3 cut off in the reverse direction, as shown in FIG. 4. When a waveform of the input voltage is in the negative half-period, it indicates that its actual direction is opposite to the reference direction, that is, the actual direction of the input voltage is "−" up and "+" down at this time. At this time, an anode of the diode D1 is at a low potential, so it is cut off in the reverse direction, but a cathode of the diode D4 is connected to a low potential, so it is conducting in the forward direction. Similarly, a cathode of the diode D3 is connected to a high potential, so it is cut off in the reverse direction, but an anode of the diode D4 is connected to a high potential, so it is conducting in the forward direction.

The connectivity of the entire circuit is shown in FIG. 4, the actual voltage generated by the current along the load resistor is still "+" up and "−" down, consistent with its reference direction, the waveform is positive, ignoring the tube voltage drop, it can be concluded that the output voltage is equal to the input voltage in magnitude.

According to FIGS. 3 and 4, it can be found that although the output voltage is DC, it is not a constant DC, but a pulsating wave (for ease of description, we call the output voltage of the rectifying circuit the "first voltage"). Assuming that a period of the input AC voltage is T1, and a period of the output voltage of the rectifying circuit (i.e., the "first voltage") is T2, it can be seen from FIGS. 3 and 4 that T1 is twice as long as T2. As a result, after full-wave rectification, the period of the output voltage is shortened by half compared to the input voltage, which facilitates the subsequent circuits (e.g., the judgment circuit 130) to detect the "power failure" earlier, and helps to make a judgment on the power failure in time and output.

Figure 5:
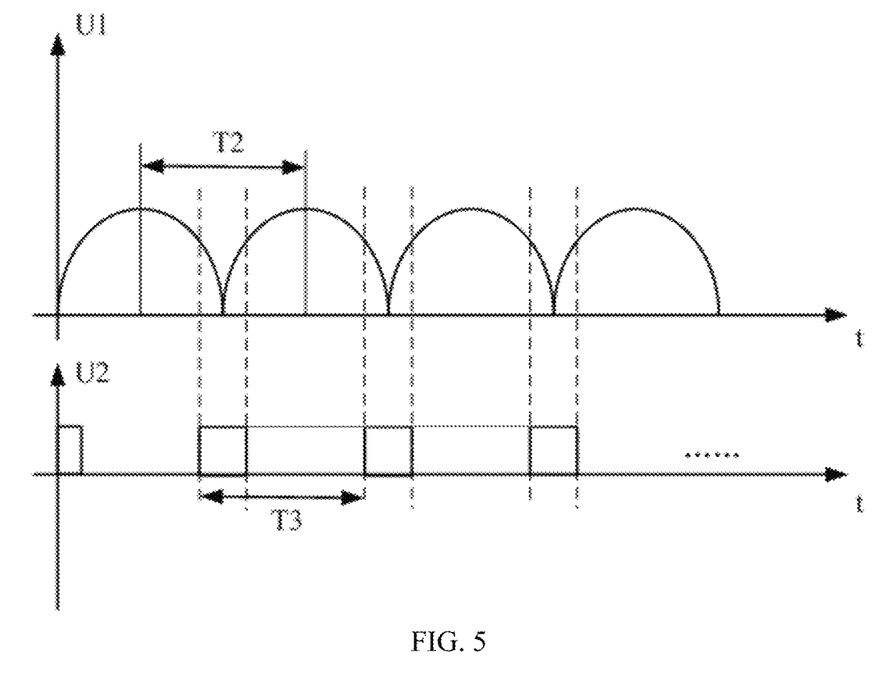
FIG. 5 is an input/output schematic diagram of a switching circuit according to embodiments of the present application.

FIG. 5 is an input/output schematic diagram of a switching circuit according to embodiments of the present application, wherein an input of the switching circuit is U1 and an output of the switching circuit is U2. In one embodiment, the switching circuit 120 utilizes a transistor to act as a switching tube, wherein an input end is coupled to a base of the transistor, an emitter of the transistor is grounded, and a collector of the transistor is connected to a power supply voltage Vcc (e.g., 5V) via a resistor. and the collector of the transistor acts as an output end. Since a conduction threshold value of the transistor is, for example, 0.7V, the output U2 is a periodic voltage pulse when the input U1 is a pulsating wave, i.e., when the transistor is conducting, the collector of the transistor is equivalent to ground, and thus the output voltage of the switching circuit is kept at a low-level, and when the transistor is cut off, the output is pulled up by the power supply voltage Vcc and is at a high-level.

From FIG. 5, it can be seen that when a period of the input voltage U1 (pulsating wave) is T2 and a period of the output voltage (i.e., periodic pulse voltage) is T3, then T2 is equal to T3.

Figure 6:
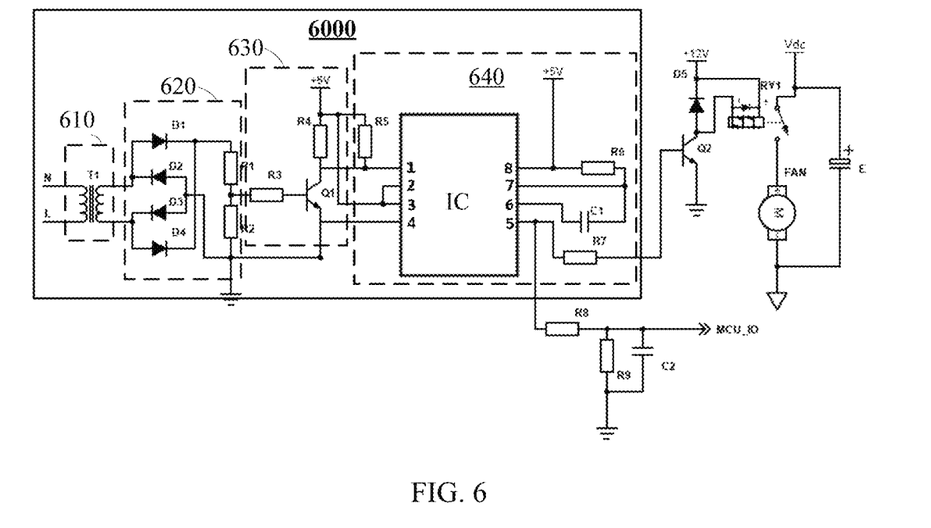
FIG. 6 is a circuit schematic diagram of a power failure detection circuit according to embodiments of the present application.

FIG. 6 is a circuit schematic diagram of a power failure detection circuit 6000 according to embodiments of the present application. As shown in FIG. 6, the power failure detection circuit 6000 comprises a rectifying circuit 620, a switching circuit 630 and a judgment circuit 640. In addition, before the rectifying circuit 620, the power failure detection circuit 6000 further comprises a step-down transformer circuit 610 (as shown in FIG. 6, the step-down transformer circuit 610 includes a transformer T1) for, e.g., converting an AC 220V voltage to an AC low voltage.

Continuing to refer to FIG. 6, the rectifying circuit 620 is a bridge rectifying circuit, which specifically comprises a first diode D1, a second diode D2, a third diode D3, a fourth diode D4, a first resistor R1, and a second resistor R2, wherein a positive electrode of the first diode D1 is coupled to a first input end of the rectifying circuit 620, a negative electrode of the first diode D1 is coupled to a first end of the first resistor R1, a negative electrode of the second diode D2 is coupled to the first input end, a positive electrode of the second diode D2 is grounded, a negative electrode of the third diode D3 is coupled to a second input end of the rectifying circuit 620, a positive electrode of the third diode D3 is grounded, a positive electrode of the fourth diode D4 is coupled to the second input end, a negative electrode of the fourth diode D4 is coupled to the negative electrode of the first diode D1, a second end of the first resistor R1 acts as an output of the rectifying circuit 620 and is coupled to a first end of the second resistor R2, and a second end of the second resistor R2 is grounded.

In the rectifying circuit 620, assuming that a period of the input AC voltage is T1 and a period of the output voltage of the rectifying circuit 620 (i.e., the "first voltage") is T2, it can be seen from FIGS. 3 and 4 that T1 is twice as long as T2. As a result, after full-wave rectification, the period of the output voltage is shortened by half compared to the input voltage, which facilitates the subsequent circuits (e.g., the judgment circuit 640) to detect the "power failure" earlier, and helps to make a judgment on the power failure in time and output.

As shown in FIG. 6, the switching circuit 630 comprises a third resistor R3, a fourth resistor R4, and a first triode Q1, wherein a first end of the third resistor R3 is coupled with an output of the rectifying circuit 620, a second end of the third resistor R3 is coupled with a base of the first triode Q1, a first end of the fourth resistor R4 is coupled to a first power supply (e.g., 5V), a second end of the fourth resistor R4 is coupled to an collector of the first triode Q1, and an emitter of the first triode is grounded.

In the switching circuit 630, when the output of the rectifying circuit 620 is a pulsating wave, the output of the switching circuit 630 should be a periodic voltage pulse, i.e., when the first triode Q1 is conducting, the collector of the first triode Q1 is equivalent to ground, and thus the output voltage of the switching circuit 630 is kept at a low-level, while when the first triode Q1 cuts off (e.g., when the voltage input to the base of the first triode Q1 is below the conduction threshold value), the output end of the switching circuit 630 is pulled up by the power supply voltage (i.e., 5V) and is at a high-level. As can be seen from FIG. 5, when a period of the input voltage (i.e., pulsating wave) is T2 and a period of the output voltage (i.e., periodic pulse voltage) of the switching circuit 630 is T3, then T2 is equal to T3.

In one embodiment, the judgment circuit 640 may comprise a monostable multivibrator which can be re-triggered and a timing circuit coupled with the monostable multivibrator, the timing circuit is used for determining the preset time period. Continuing to refer to FIG. 6, the monostable multivibrator which can be re-triggered may be implemented by an IC chip circuit, and the timing circuit may be implemented by a sixth resistor R6 and a first capacitor C1, the preset time period is determined according to a capacitance value of the first capacitor and a resistance value of the sixth resistor.

As shown in FIG. 6, the IC chip circuit has eight pins, wherein pin 1 is coupled with a collector of the first transistor Q1 and is coupled with a 5V power supply through the fifth resistor R5; pin 2 and pin 3 are both coupled to the 5V power supply; pin 4 is grounded; pin 5 is an output; pin 6 is coupled to a first end of the first capacitor C1; pin 7 is coupled to a second end of the first capacitor C1 as well as to a first end of the sixth resistor; and pin 8 is coupled to the 5V power supply and a second end of the sixth resistor.

Figure 7:
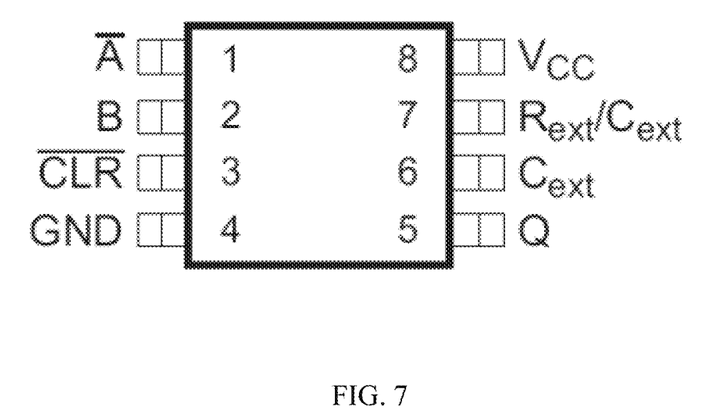
FIGS. 7 and 8 are a chip pin schematic diagram and a logic schematic diagram, respectively, of a monostable multivibrator which can be re-triggered according to embodiments of the present application.

FIG. 7 shows a chip pin schematic diagram of a monostable multivibrator which can be re-triggered according to embodiments of the present application. A description of each pin can be found in Table 1 below:

TABLE 1

| Pin Name | No. | Input/Output | Description |
|---|---|---|---|
| $\overline{A}$ | 1 | Input | Falling edge trigger; B and $\overline{CLR}$ are required to keep high |
| B | 2 | Input | Rising edge trigger; $\overline{A}$ is required to keep low and $\overline{CLR}$ is required to keep high |
| $\overline{CLR}$ | 3 | Input | Clear function, low-level function; It can also act as a rising edge sensitive input when $\overline{A}$ is kept low and B is kept high |
| GND | 4 | — | Ground |
| Q | 5 | Output | Output |
| $C_{ext}$ | 6 | — | Connect only external capacitors |
| $R_{ext}/C_{ext}$ | 7 | — | Connect external capacitors and resistors |
| Vcc | 8 | — | Power supply |

Figure 8:
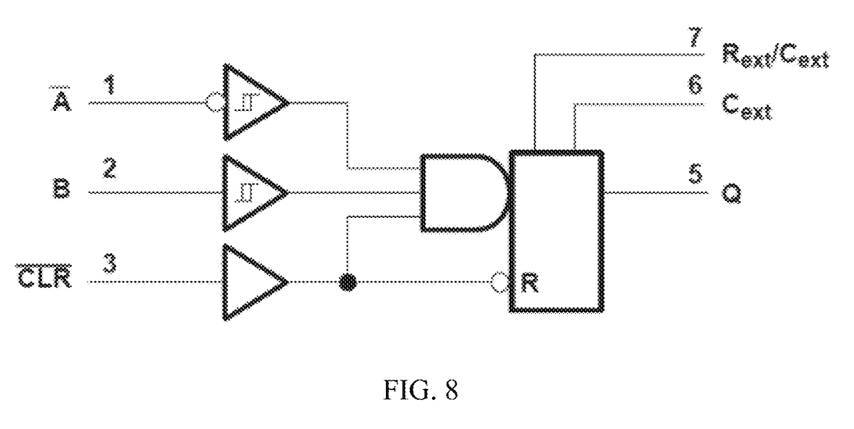

FIG. 8 further shows a logic schematic diagram of a monostable multivibrator which can be re-triggered according to embodiments of the present application. An output pulse duration (i.e., a preset time period) of this monostable multivibrator may be set by selecting appropriate external resistors and capacitors. In the embodiment of FIG. 6, the preset time period is set by means of an external resistor R6 and a capacitor C1.

Returning to FIG. 6, in the judgment circuit 640 shown in FIG. 6, when there is a continuous periodic pulse voltage input on pin 1 of the IC chip circuit, pin 5 (i.e., the output end) of the IC chip circuit will continuously output a high-level. However, if the pulse voltage input is not received at pin 1 within the preset time period (set by the external resistor R6 and the capacitor C1), pin 5 of the IC chip circuit will fall back to a low-level. Based on this output, the fan control circuit will turn off the fan, and the micro-control unit will turn off the electronic expansion valve.

In one or more embodiments, the IC chip circuit (i.e., the monostable multivibrator which can be re-triggered) may be implemented using an SN74LVC1G123 ship. It will be appreciated by those skilled in the art that the particular chip described above is used for illustrative purposes only and not as a limitation, and that other types of chip circuits may also be used to implement the same function.

The following describes operating principle of the power failure detection circuit 6000 shown in FIG. 6.

In the presence of utility power supply AC 220V, this AC voltage is applied to the rectifying circuit 620 through the step-down transformer circuit 610 to obtain an output of the rectifying circuit 620 (referred to as a "first voltage"). This first voltage is converted into a periodic voltage pulse that is provided to the judgment circuit 640 after passing through the switching circuit 630. When the IC chip circuit (i.e., the monostable multivibrator which can be re-triggered) in the judgment circuit 640 continuously has a periodic pulse voltage input at its input pin (pin 1 in FIG. 6), a high-level is continuously output via output pin (pin 5 in FIG. 6). When there is a sudden power outage, i.e. no voltage is supplied to the step-down transformer circuit 610, the rectifying circuit 620 and the switching circuit 630, the voltage input to the input pin (pin 1 in FIG. 6) of the IC chip circuit in the judgment circuit 640 will be high-level, i.e., there is no periodic pulse voltage input, and then, after the preset time period, the judgment circuit 640 will output a low-level via the output pin (pin 5 in FIG. 6) of the IC chip circuit.

Figure 9:
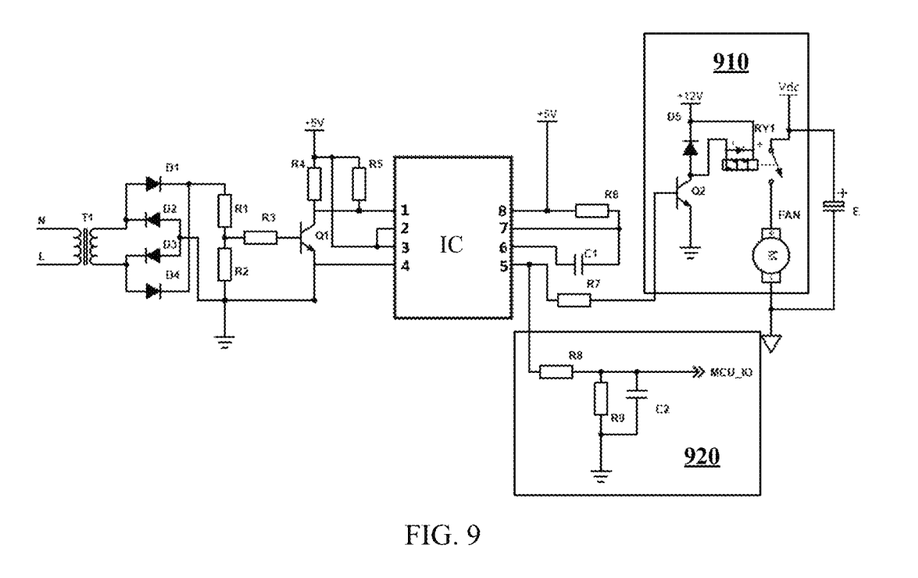
FIG. 9 is a circuit schematic diagram of a control circuit for a variable refrigerant flow VRF system according to embodiments of the present application.

FIG. 9 is a circuit schematic diagram of a control circuit for a variable refrigerant flow VRF system according to embodiments of the present application. As can be seen from FIG. 9, the control circuit includes, in addition to a power failure detection circuit (for detecting a power failure condition of a power supply and generating an output signal accordingly), a fan control circuit 910, a micro-control unit interrupt generating circuit 920 and an energy storage unit E, wherein the fan control circuit 910 is used for controlling a fan according to an output signal of the power failure detection circuit; the micro-control unit interrupt generating circuit 920 is used for generating an interrupt signal according to the output signal to provide to a micro-control unit; the energy storage unit E is used for providing electrical energy for the micro-control unit to close an electronic expansion valve.

The internal circuit structure of the power failure detection circuit of FIG. 9 is the same as that of the power failure detection circuit 6000 of FIG. 6, both of which comprise: a rectifying circuit for full-wave rectifying an alternating current voltage so as to obtain a first voltage; a switching circuit for converting the first voltage into a periodic voltage pulse; and a judgment circuit for determining that there is the power failure condition of the power supply when the periodic voltage pulse is not received within a preset time period, and generating the output signal accordingly. Thus, the description with respect to FIG. 6 may be equally applicable to FIG. 9 and will not be repeated herein.

As shown in FIG. 9, the fan control circuit 910 comprises: a second triode Q2, a fifth diode D5 and an electromagnetic relay RY1, wherein a base of the second triode Q2 is coupled to the power failure detection circuit (its output), an emitter of the second triode Q2 is grounded, a collector of the second triode Q2 is coupled to a positive electrode of the fifth diode D5, and a negative electrode of the fifth diode D5 is coupled to a second power supply (i.e., +12V), a first end of the electromagnetic relay RY1 is coupled to a positive electrode of the fifth diode D5, and a second end of the electromagnetic relay RY1 is coupled to the negative electrode of the fifth diode D5.

As previously mentioned, the power failure detection circuit will continuously output a high-level signal when the utility power supply is normally supplied, for example, and will switch to output a low-level signal when a power failure condition of the power supply is determined to exist. Thus, when the utility power supply is normally supplied, the high-level signal will be applied to the base of the second triode Q2, the second triode Q2 will conduct, the second power supply +12V will be applied to the electromagnetic relay RY1, so that the electromagnetic relay RY1 will operate and close its switch, and the Vdc will continue to supply power to the fan to operate. In the presence of the power failure condition of the power supply, the power failure detection circuit will output a low-level signal which will cause the second triode Q2 to cut off, the electromagnetic relay RY1 will not operate and the switch will be disconnected, thereby disconnecting a loop formed by the switch, the fan, and the energy storage unit E. Moreover, the external power supply Vdc will not be able to provide power to the fan, and thus the fan will stop operating.

With continued reference to FIG. 9, the micro-control unit interrupt generating circuit 920 comprises an eighth resistor R8, a ninth resistor R9, and a second capacitor C2, wherein a first end of the eighth resistor R8 is coupled with an output of the power failure detection circuit, a second end of the eighth resistor R8 is coupled to an IO terminal of the micro-control unit MCU, a first end of the ninth resistor R9 is coupled with the second end of the eighth resistor R8, a second end of the ninth resistor R9 is grounded, a first end of the second capacitor C2 is coupled with the second end of the eighth resistor R8, and a second end of the second capacitor C2 is grounded. Since the power failure detection circuit is configured to output a high-level signal when the power supply is normally supplied, and to output a low-level signal when it is determined that a power failure condition of a power supply exists. Thus, the output signal of the micro-control unit interrupt generating circuit 920 (i.e., the signal supplied to the IO terminal of the micro-control unit MCU) will change with the change in the output of the power failure detection circuit. Compared to the output of the power failure detection circuit, the output signal of the micro-control unit interrupt generating circuit 920 is smoother, avoiding burr signals.

In summary, in accordance with some embodiments of the present application, the power failure detection circuit comprises the rectifying circuit for full-wave rectifying an alternating current voltage and the switching circuit for converting it into a periodic voltage pulse. The power failure detection circuit further comprises the judgment circuit for providing an output signal to the fan control circuit for closing the fan when the periodic voltage pulse is not received within the preset time period, and providing the output signal to the micro-control unit for closing the electronic expansion valve. In this way, the power failure detection circuit can, on the one hand, timely close the fan through the fan control circuit in the event of a power failure to save energy in the energy storage unit, and on the other hand, timely notify the micro-control unit so as to utilize the energy in the energy storage unit to close the electronic expansion valve, thus avoiding safety hazards. In addition, the judgment circuit provides corresponding output signals (e.g., a low-level signal) to the fan control circuit and the micro-control unit when the periodic voltage pulse is not received within the preset time period, thus avoiding "false closing" of the fan and the electronic expansion valve caused by an unstable input signal from a utility power supply and other reasons.

Those skilled in the art will appreciate that the various illustrative logical blocks, modules, circuits, and algorithm steps described herein may be implemented as electronic hardware, computer software, or combinations of both.

To demonstrate this interchangeability between hardware and software, various illustrative components, blocks, modules, circuits, and steps have been described above generally in terms of their functionality. Whether such functionality is implemented in hardware or software depends on the particular application and design constraints imposed on the overall system. Those skilled in the art may implement the described functionality in changing ways for the particular application. However, such implementation decisions should not be interpreted as causing a departure from the scope of the present application.

Although only a few of the specific embodiments of the present application have been described, those skilled in the art will appreciate that the present application may be embodied in many other forms without departing from the spirit and scope thereof. Accordingly, the examples and implementations presented are to be regarded as illustrative and not restrictive, and various modifications and substitutions may be covered by the application without departing from the spirit and scope of the application as defined by the appended claims.

The embodiments and examples presented herein are provided to best illustrate embodiments in accordance with the present technology and its particular application, and to thereby enable those skilled in the art to implement and use the present application. However, those skilled in the art will appreciate that the above description and examples are provided for convenience of illustration and example only. The presented description is not intended to cover every aspect of the application or to limit the application to the precise form disclosed.

What is claimed is:

1. A power failure detection circuit, characterized by comprising:
   a rectifying circuit for full-wave rectifying an alternating current voltage so as to obtain a first voltage;
   a switching circuit for converting the first voltage into a periodic voltage pulse; and
   a judgment circuit for providing an output signal to a fan control circuit for closing a first component when the periodic voltage pulse is not received within a preset time period, and providing the output signal to a micro-control unit for closing a second component, wherein the second component is an electronic expansion valve.

2. The power failure detection circuit of claim 1, wherein the first component is a fan, a period T1 of the alternating current voltage is twice a period T2 of the first voltage, and a period T3 of the periodic voltage pulse is the same as the period T2 of the first voltage.

3. The power failure detection circuit of claim 1, wherein the preset time period is greater than the period T3 of the periodic voltage pulse, but less than twice the period T3 of the periodic voltage pulse.

4. The power failure detection circuit of claim 1, wherein the rectifying circuit comprises a first diode, a second diode, a third diode, a fourth diode, a first resistor, and a second resistor, wherein a positive electrode of the first diode is coupled to a first input end of the rectifying circuit, a negative electrode of the first diode is coupled to a first end of the first resistor, a negative electrode of the second diode is coupled to the first input end, a positive electrode of the second diode is grounded, a negative electrode of the third diode is coupled to a second input end of the rectifying circuit, a positive electrode of the third diode is grounded, a positive electrode of the fourth diode is coupled to the second input end, a negative electrode of the fourth diode is coupled to the negative electrode of the first diode, and a second end of the first resistor act as an output of the rectifying circuit and is coupled to a first end of the second resistor, and a second end of the second resistor is grounded.

5. The power failure detection circuit of claim 4, wherein the switching circuit comprises a third resistor, a fourth resistor, and a first triode, wherein a first end of the third resistor is coupled with the output of the rectifying circuit, a second end of the third resistor is coupled with a base of the first triode, a first end of the fourth resistor is coupled to a first power supply, a second end of the fourth resistor is coupled to a collector of the first triode, and an emitter of the first triode is grounded.

6. The power failure detection circuit of claim 1, wherein the judgment circuit comprises:
a monostable multivibrator which can be re-triggered; and
a timing circuit coupled with the monostable multivibrator, the timing circuit being used for determining the preset time period.

7. The power failure detection circuit of claim 6, wherein the timing circuit comprises a first capacitor and a sixth resistor, wherein the preset time period is determined according to a capacitance value of the first capacitor and a resistance value of the sixth resistor.

8. A control circuit for a variable refrigerant flow VRF system, characterized by comprising:
a power failure detection circuit for detecting a power failure condition of a power supply and generating an output signal accordingly;
a fan control circuit for controlling a fan according to the output signal;
a micro-control unit interrupt generating circuit for generating an interrupt signal according to the output signal to provide to a micro-control unit; and
an energy storage unit for providing electrical energy for the micro-control unit to close an electronic expansion valve, wherein the power failure detection circuit comprises:
a rectifying circuit for full-wave rectifying an alternating current voltage so as to obtain a first voltage;
a switching circuit for converting the first voltage into a periodic voltage pulse; and
a judgment circuit for determining that there is the power failure condition of the power supply when the periodic voltage pulse is not received within a preset time period, and generating the output signal accordingly.

9. The control circuit of claim 8, wherein the judgment circuit is configured to output a high-level signal when the power supply is normally supplied, and output a low-level signal when it is determined that there is the power failure condition of the power supply.

10. The control circuit of claim 9, wherein the fan control circuit comprises: a second triode, a fifth diode, and an electromagnetic relay, wherein a base of the second triode is coupled to the power failure detection circuit, an emitter of the second triode is grounded, a collector of the second triode is coupled to a positive electrode of the fifth diode, a negative electrode of the fifth diode is coupled to a second power supply, a first end of the electromagnetic relay is coupled to the positive electrode of the fifth diode, and a second end of the electromagnetic relay is coupled to the negative electrode of the fifth diode.

11. The control circuit of claim 9, wherein the fan control circuit is configured to disconnect a switch of the electromagnetic relay upon receiving the low-level signal from the power failure detection circuit, thereby disconnecting a loop formed by the switch, the fan, and the energy storage unit.

12. The power failure detection circuit of claim 1, wherein the first component is a fan.

13. The power failure detection circuit of claim 1, wherein a period T1 of the alternating current voltage is twice a period T2 of the first voltage, and a period T3 of the periodic voltage pulse is the same as the period T2 of the first voltage.

14. The power failure detection circuit of claim 1, wherein the rectifying circuit comprises a first diode, a second diode, a third diode, a fourth diode, a first resistor, and a second resistor.

15. The power failure detection circuit of claim 1, wherein the switching circuit comprises a third resistor, a fourth resistor, and a first triode, wherein a first end of the third resistor is coupled with the output of the rectifying circuit, a second end of the third resistor is coupled with a base of the first triode, a first end of the fourth resistor is coupled to a first power supply, a second end of the fourth resistor is coupled to a collector of the first triode, and an emitter of the first triode is grounded.

16. The power failure detection circuit of claim 1, wherein the switching circuit comprises a third resistor, a fourth resistor, and a first triode.

17. The control circuit of claim 8, wherein the fan control circuit comprises: a second triode, a fifth diode, and an electromagnetic relay, wherein a base of the second triode is coupled to the power failure detection circuit, an emitter of the second triode is grounded, a collector of the second triode is coupled to a positive electrode of the fifth diode, a negative electrode of the fifth diode is coupled to a second power supply, a first end of the electromagnetic relay is coupled to the positive electrode of the fifth diode, and a second end of the electromagnetic relay is coupled to the negative electrode of the fifth diode.

18. The control circuit of claim 8, wherein the fan control circuit is configured to disconnect a switch of the electromagnetic relay upon receiving the low-level signal from the power failure detection circuit, thereby disconnecting a loop formed by the switch, the fan, and the energy storage unit.

19. A power failure detection circuit, characterized by comprising:
a rectifying circuit for full-wave rectifying an alternating current voltage so as to obtain a first voltage;
a switching circuit for converting the first voltage into a periodic voltage pulse; and
a judgment circuit for providing an output signal to a fan control circuit for closing a first component when the periodic voltage pulse is not received within a preset time period, and providing the output signal to a micro-control unit for closing a second component,
wherein the judgment circuit comprises:
a monostable multivibrator which can be re-triggered; and
a timing circuit coupled with the monostable multivibrator, the timing circuit being used for determining the preset time period.

20. The power failure detection circuit of claim 19, wherein the timing circuit comprises a first capacitor and a sixth resistor, wherein the preset time period is determined according to a capacitance value of the first capacitor and a resistance value of the sixth resistor.

* * * * *